United States Patent
Biage et al.

(10) Patent No.: US 9,357,070 B2
(45) Date of Patent: May 31, 2016

(54) RECOVERY OF ESTABLISHED EMERGENCY CALLS

(71) Applicant: SOLACOM TECHNOLOGIES INC., Gatineau (CA)

(72) Inventors: Daniel Biage, Gatineau (CA); Gilles Ferland, Kingston (CA)

(73) Assignee: Solacom Technologies Inc., Gatineau (CA)

( * ) Notice: Subject to any disclaimer, the term of this patent is extended or adjusted under 35 U.S.C. 154(b) by 0 days.

(21) Appl. No.: 14/039,633

(22) Filed: Sep. 27, 2013

(65) Prior Publication Data

US 2015/0092537 A1    Apr. 2, 2015

(51) Int. Cl.
*G01R 31/08* (2006.01)
*H04M 3/51* (2006.01)
*H04L 29/06* (2006.01)
*H04L 29/14* (2006.01)

(52) U.S. Cl.
CPC ........... *H04M 3/5116* (2013.01); *H04L 65/105* (2013.01); *H04L 65/1006* (2013.01); *H04L 65/1069* (2013.01); *H04L 65/80* (2013.01); *H04L 69/40* (2013.01)

(58) Field of Classification Search
CPC .................................................. H04L 65/1006
USPC .......... 370/259–270, 328–339, 390; 455/426, 455/518–519, 404, 445
See application file for complete search history.

(56) References Cited

U.S. PATENT DOCUMENTS

| | | | |
|---|---|---|---|
| 8,811,936 B2 * | 8/2014 | Wu | 455/404.1 |
| 2007/0149166 A1 * | 6/2007 | Turcotte et al. | 455/404.1 |
| 2013/0201878 A1 * | 8/2013 | Ephraim et al. | 370/259 |

* cited by examiner

*Primary Examiner* — Iqbal Zaidi
(74) *Attorney, Agent, or Firm* — Gowling WLG (Canada) LLP; Mark Sprigings (57) ABSTRACT

A system, method and apparatus for re-establishing a call received at a public safety answering point are described. A Session Initiation Protocol (SIP) call establishment request is received at an emergency call answer node. The call establishment request has an indication of a previously established emergency call to re-establish. The emergency call answer node searches a call recovery queue for a previously received call establishment request having a matching indication for the previously established emergency call to re-establish. The emergency call answer node bridges a call leg for the received call establishment request and a call leg for the previously received call establishment request having the matching indication for the previously established emergency call to re-establish when a match is found.

15 Claims, 7 Drawing Sheets

RECOVERY OF ESTABLISHED EMERGENCY CALLS

TECHNICAL FIELD

The present disclosure relates to the management of emergency calls, and in particular to systems, apparatuses and methods for re-establishing calls at a Public-Safety Answering Points.

BACKGROUND

Emergency call services, such as 9-1-1 in North America, establish a call between a caller and an operator. The operator can direct the response to the emergency. For example, a caller may call to report a car accident and the operator can dispatch emergency vehicles.

When an established call is dropped, for example due to a failure of a component in the communication path, the operator may attempt to re-establish the call with the caller by calling back to the number. However, calling back can be problematic as it requires additional time, requires the caller to hang the existing call and/or requires the caller to answer the call as well as other potential problems.

It is desirable to be able to be able to re-establish emergency calls between a caller and an operator with no intervention by the caller.

BRIEF DESCRIPTION OF THE DRAWINGS

Further features and advantages of the present disclosure will become apparent from the following detailed description, taken in combination with the appended drawings, in which.

DETAILED DESCRIPTION

In accordance with the present disclosure, there is provided a method of re-establishing a call received at a public safety answering point. The method comprising receiving a Session Initiation Protocol (SIP) call establishment request at an emergency call answer node, the call establishment request having an indication of a previously established emergency call to re-establish; searching a call recovery queue at the emergency call answer node for a previously received call establishment request having a matching indication for the previously established emergency call to re-establish; and bridging at the emergency call answer node a call leg for the received call establishment request and a call leg for the previously received call establishment request having the matching indication for the previously established emergency call to re-establish when a match is found.

In accordance with the present disclosure, there is provided an apparatus for re-establishing a call received at a public safety answering point. The apparatus comprising: a processor unit for executing instructions; and a memory for storing instructions, which when executed by the processor unit configure the apparatus to: receive a Session Initiation Protocol (SIP) call establishment request having an indication of a previously established emergency call to re-establish; search a call recovery queue for a previously received call establishment request having a matching indication for the previously established emergency call to re-establish; and bridge a call leg for the received call establishment request and a call leg for the previously received call establishment request having the matching indication for the previously established emergency call to re-establish when a match is found.

In accordance with the present disclosure, there is provided a system for re-establishing a call received at a public safety answering point. The public safety answering point comprising an emergency call answer node and a SIP proxy noted. The public safety answering point comprising: a processor unit for executing instructions; and a memory for storing instructions, which when executed by the processor unit configure the apparatus to: receive a Session Initiation Protocol (SIP) call establishment request having an indication of a previously established emergency call to re-establish; search a call recovery queue for a previously received call establishment request having a matching indication for the previously established emergency call to re-establish; and bridge a call leg for the received call establishment request and a call leg for the previously received call establishment request having the matching indication for the previously established emergency call to re-establish when a match is found. The SIP proxy node comprising: a processor unit for executing instructions; and a memory for storing instructions, which when executed by the processor unit configure the SIP proxy node to: receive an emergency call initiation request; direct establishment of a call leg for the emergency call between an initial emergency call answer node and an emergency call operator workstation; direct establishment of a call leg for the emergency call between the initial emergency call answer node and an emergency call gateway; detect a failure of the initial emergency call answer node; and cause, with the SIP proxy, transmittal of one of the SIP call establishment request or the previously received call establishment request.

Emergency calls are placed to a single number and routed to an appropriate answering point. The emergency number is generally common to a large geographic area, for example, 9-1-1 in North America or 1-1-2 in Europe. The emergency call infrastructure may be provided by various interacting systems. Modern emergency call answering centers, which may be referred to as Public-Safety Answering Points (PSAPs), make use of Session Initiation Protocol (SIP) functionality for managing emergency calls. Using SIP, emergency calls can be established as a number of connected call legs. For example, a call leg may be established between the calling device and an application server of a PSAP. The application server may locate an available operator, establish another call leg from the application server to the operator and then bridge the two call legs to establish the call between the caller and emergency operator. The application server may provide additional functionality, such as call transfer, call recording, etc.

When an application server at a PSAP fails, emergency calls that were established through the application server will be disconnected. As will be appreciated, it is desirable to be able to quickly re-establish the lost calls. In re-establishing the calls it is desirable to have the same caller re-connected with the same operator in order to avoid confusion, or wasted time having to explain an emergency situation to a new operator. Further, it is desirable to re-establish lost calls without intervention by the user. As described further below, it is possible to detect a failure of an application server and re-establish call legs to a secondary or back-up server, which can then bridge call legs of previously established calls in order to re-establish the previous calls.

Figure 1:
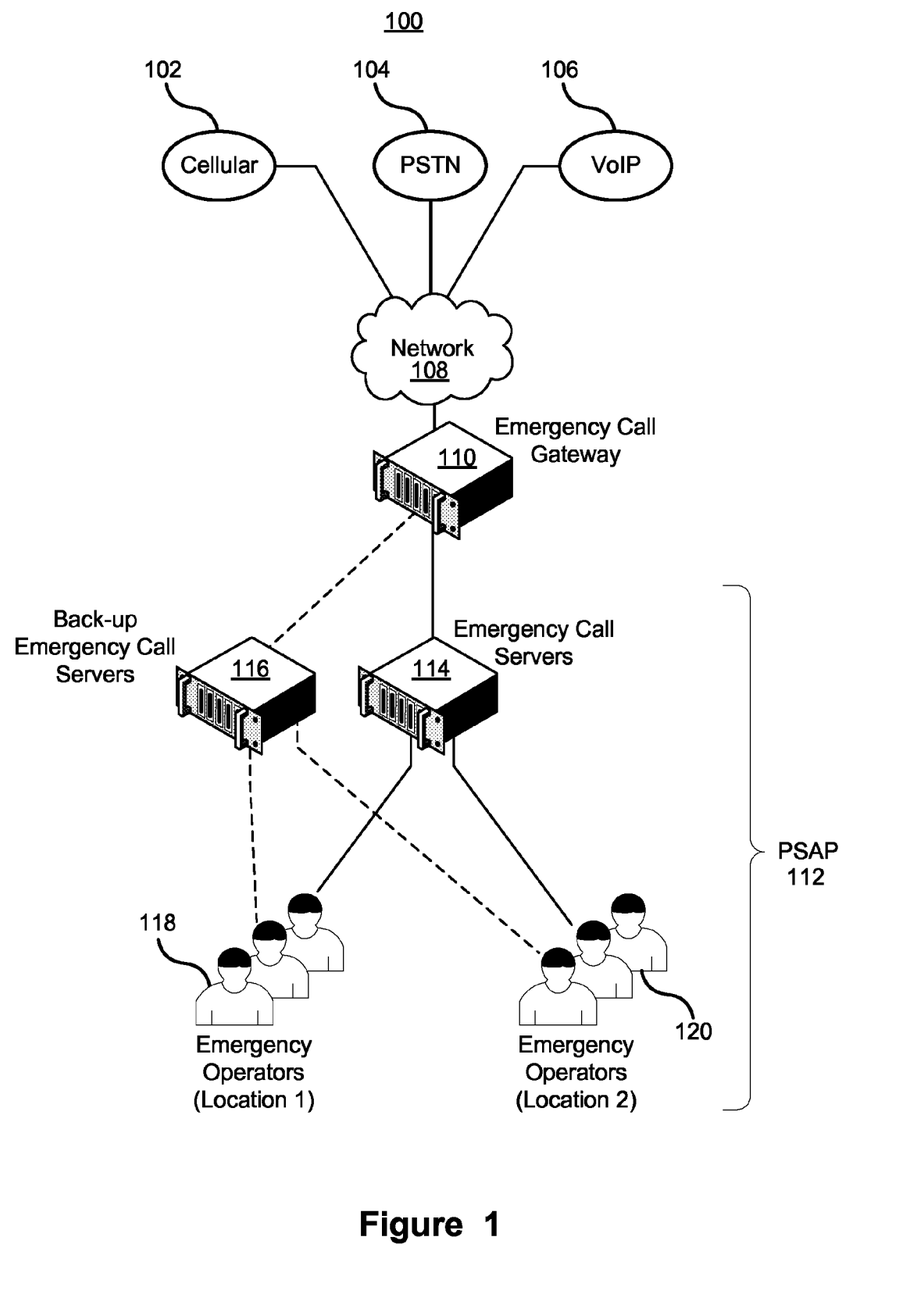
FIG. 1 depicts an environment in which the present call re-establishment may be used.

FIG. 1 depicts an environment in which the present call re-establishment may be used. The environment 100 includes a number of different technologies for establishing a call. The technologies may include, for example, cellular or mobile infrastructure 102, a Public-Switched Telephone Network (PSTN) infrastructure 104 and Voice over Internet Protocol (VoIP) infrastructure 106. One or more networks 108 allow a call from any of the infrastructures 102, 104, 106 to be routed to an emergency call gateway 110. The emergency call gateway can route the call to an appropriate PSAP 112.

The network route a call to the emergency call gateway 110. Although only a single emergency call gateway 110 is depicted, a plurality of gateways may be provided. The additional gateways may serve different geographic areas and/or may provide backup functionality in case of a failure of the gateway 110. When a call is received at the gateway 110 it can establish the call through the emergency call servers 114 of PSAP 112. The emergency call servers 114 may comprise a call answering server or server that receives the routed call and connects the call to an available emergency operator. The operators may be located in one or more locations 118, 120. In order to provide redundancy in case of equipment failure or malfunction, the PSAP 112 may include additional redundant emergency call servers 116. The redundant emergency call servers 116 provide the same functionality as the emergency call servers 114, however are intended to be used when the emergency call servers 114 fail or experience an interruption. The redundant emergency call servers 116 may be located in different physical locations to ensure that a physical disruption that caused the emergency call servers 114 to fail, such as a local power failure or hardware failure, that would not also cause the redundant servers 116 to fail.

When an emergency call servers 114 fails, due to a server or component failure, any established calls on the server will be dropped. As described further herein, the dropped calls can be re-established on the redundant server 116 with no interaction from the caller. The call can be re-established with the same operator and as such the caller will not notice any impact from the failed call server, other than a possible period of silence as the call is re-established.

Figure 2:
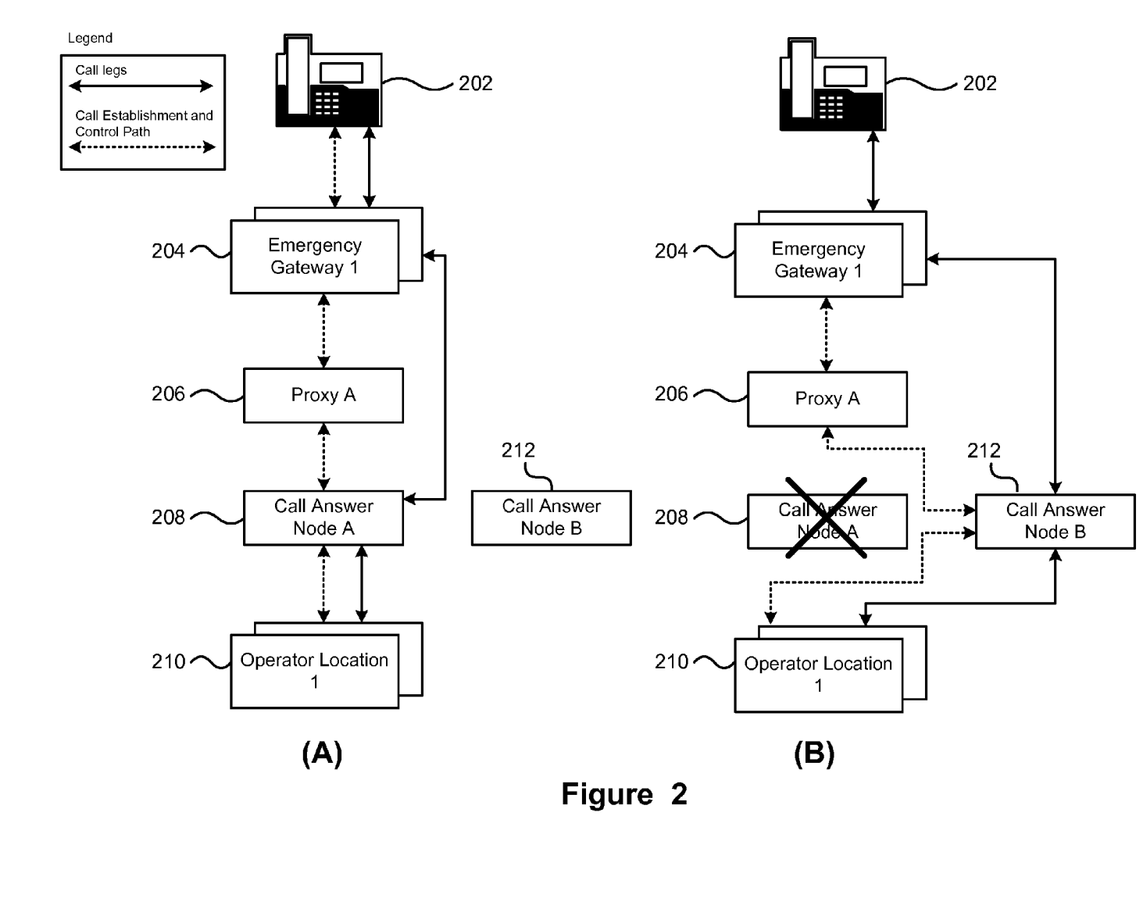
FIG. 2 depicts a call re-establishment system and process.

FIG. 2 depicts a call re-establishment system and process. As depicted, an emergency call can be placed from a phone 202. Although depicted as a desk phone, the call may be established from any number of calling devices, including cellular telephones, VoIP user agents. The call is routed from the phone 202 to an emergency gateway 204. The system may comprise a number of emergency gateways as backups in case of a failure of an emergency gateway and/or to provide emergency service to a larger area. The emergency gateway establishes the emergency call with a call answer node A 208 though a proxy 206. The call answer node A 208 establishes the call with an operator at one of a possible number of different operator locations 210.

The emergency call received at the emergency gateway 204 may be received over the PSTN network, a VoIP network or other communication networks. The emergency gateway 204 is capable of establishing a first call leg with the phone 202. The emergency gateway 204 then attempts to establish the second leg of the emergency call with an appropriate operator. The emergency gateway 204 uses SIP/VoIP techniques to establish the call legs to the operator. The emergency gateway passes a call initiation request to a SIP proxy 206, which in turn passes a call initiation request to the call answer node A 208. The call answer node A 208 can establish a call leg, through media exchanged for example using Real-time Transport Protocol (RTP) techniques, with the emergency gateway 204. The call answer node A 208 may also determine an operator workstation that the emergency call can be established with. Once an operator is determined and a call leg established between the call answer node A 208 and the operator, the individual call legs can be bridged or otherwise connected together in order to establish the emergency call between the caller's telephone 202 and the operator. As depicted in FIG. 2A, the media of the emergency call, for example the audio and/or video of the call, is exchanged through the call answer node 208 and the emergency gateway 204 by passing the proxy 206. The control channel of the emergency call passes through the proxy 206 and as such, the proxy is capable of modifying the call.

If the call answer node A 208 fails, any call legs established on the call answer node A 208 will be dropped. Accordingly, if nothing else is done upon the failure the emergency call will fail. However, the proxy 206 can monitor the status of the call answer node A 208 to detect if there is a failure. When the call answer node A 208 fails, the proxy can re-establish the emergency calls through another call answer node B 212 as depicted in FIG. 2B. Similarly, the operator workstation at the call answer location 210 can monitor the status of the call answer node A 208 and attempts to re-establish the call with the backup call answer node B 212. The backup call answer node receives the re-establishment requests from the proxy and the operator workstations and attempts to re-establish the previous calls between a caller and operator. The re-establishment requests received at the backup call answer node B 212 from both the proxy 206 and the operator workstations include identifying information of the previously established call. Accordingly, the backup call answer node B 212 can re-establish the emergency calls by connecting the call requests that have matching call identifying information.

In FIGS. 2A and 2B, the proxy 206 is depicted as being co-located with the call answer node A 208. While such an arrangement can still provide call re-establishment in some situations, the proxy 206 may be likely to experience a failure at the same time as the call answer node A 208, for example as a result of hardware failure, software failure, power outage or fire, and as such, would not function to re-establish the emergency calls.

Figure 3:
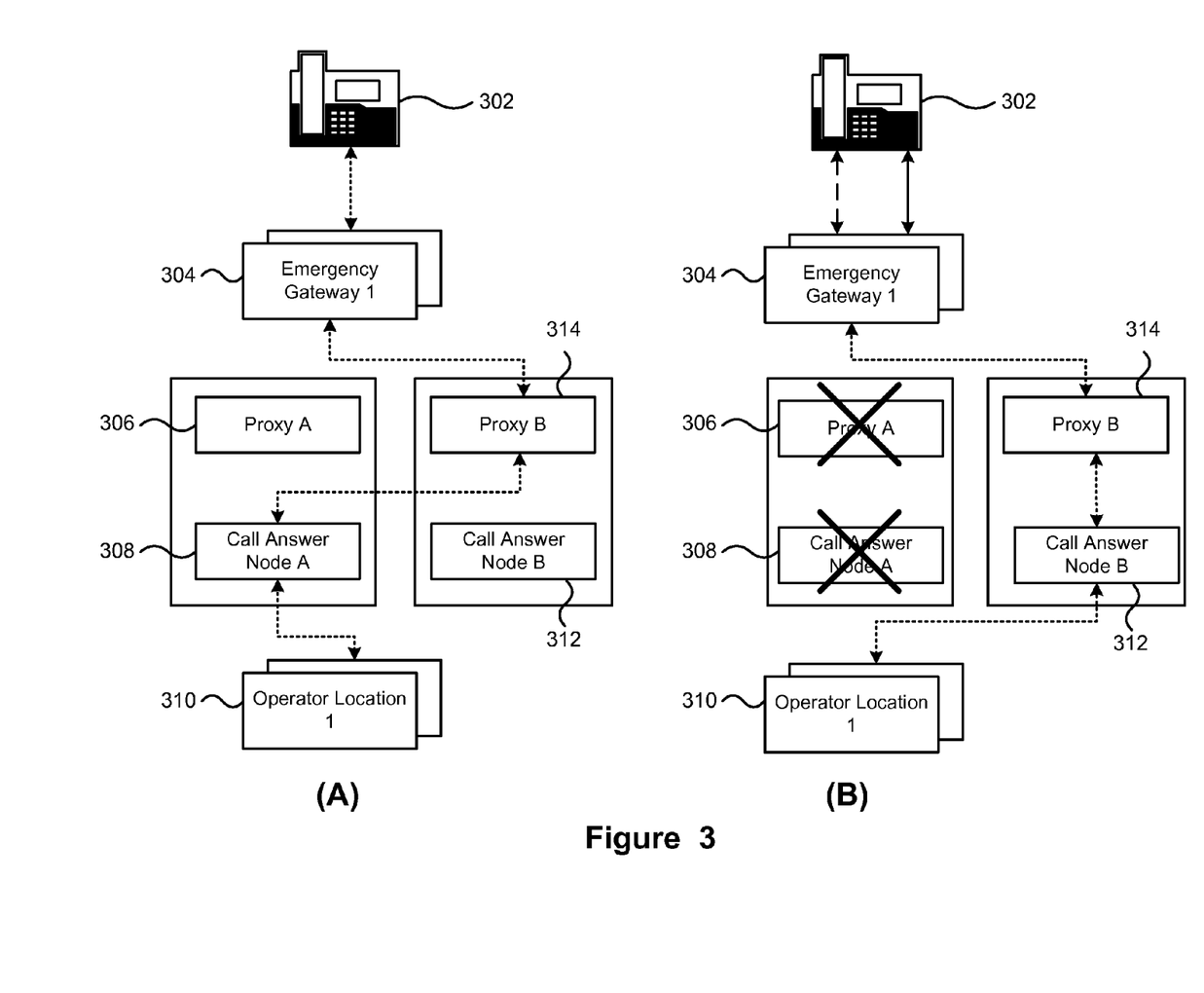
FIG. 3 depicts a further call re-establishment system and process.

FIGS. 3A and 3B depict a further call re-establishment system and process. The system and process is similar to that described above with regard to FIGS. 2A and 2B; however, a proxy 306, 314 is associated with each call answer node 308, 312. The proxy and call answer node pairs 306, 308 and 314, 312 may be physically remote from each other to mitigate the possibility of a single failure event affecting both locations. The proxy and call answer node of each pair may be provided on the same physical server or on co-located physical servers.

As depicted in FIGS. 3A and 3B, the proxy that is located separate from the call answer node is used in establishing calls to that call answer node. That is, in FIGS. 3A and 3B, Proxy B 314 is used to establish calls to the call answer node A 308. As depicted, a call to the emergency gateway 304 is routed to the proxy B 314, which in turn routes the call to the call answer node A 308. The call answer node 308 determines an operator workstation at one of a possible plurality of operator locations 310. The call can be established as a plurality of connected call legs between the calling device 302 and the emergency gateway 304, the emergency gateway 304 and the call answer node a 308 and the call answer node A and the operator workstation at the operator location 310. If the call answer node A 308 fails it is likely that the proxy A 306, which is either on the same physical server or at on a co-located physical server, will also fail as depicted in FIG. 3B. However, proxy B 312, which was used in establishing the call, will likely not suffer from the same failure and as such can detect the failure of the call answer node A 308 and re-establish calls through the call answer node B 312.

In FIGS. 2A,2B and 3A,3B the failure of the respective call answer node is detected by both the proxy that established the call as well as the operator's workstation that the call was connected to. The call answer node failure may be detected in various ways. For example, both the proxy may use a heartbeat signal mechanism. In such a case, the proxy periodically transmits a heartbeat signal to the call answer node, which receives the heartbeat signal and transmits a response back to the proxy if the call answer node is functioning. If no response is received from the call answer node in a set period of time, the proxy assumes that the call answer node has failed and attempts to re-establish the calls through another call answer node. The operator workstation can use a similar heartbeat technique to detect failure of the call answer node. Additionally or alternatively, if the proxy is able to determine which of the operator's workstations the call was established to, the proxy may send a message to the operator's workstation informing it of the failure of the call answering node.

The proxy and the operator workstation co-operate to re-establish the previous calls on the backup call answer node. In particular, each of the proxy and the operator workstation can send a re-establishment request to the backup answer point node. Each of the transmitted requests includes information that may be used in determining which callers and operators need to be re-connected to each other in order to re-establish the calls. The transmitted requests may be for example a re-INVITE request or a REFER request that includes an identification of the previously established call. The indication may be, for example, a unique identifier assigned to the original call when it was established. The requests may further identify that the request is for re-establishing previous calls, as opposed to a request to establish a new call.

When the call answer node receives a request that includes an indication that the request is for re-establishing a call, the call answer node checks a re-establishment queue in order to determine if another request to establish a call was received that has matching identifying information. If requests are received at the call answer node that have matching call identification information, the call answer node establishes the call legs and connects the two call legs in order to re-establish the previous call. If the call answer node does not find a request in the re-establishment queue that has matching call identifying information, the request can be placed in the re-establishment queue so that a subsequent request, from either the proxy or the operator workstation, will locate its matching pair for re-establishing the previous call.

Figure 4:
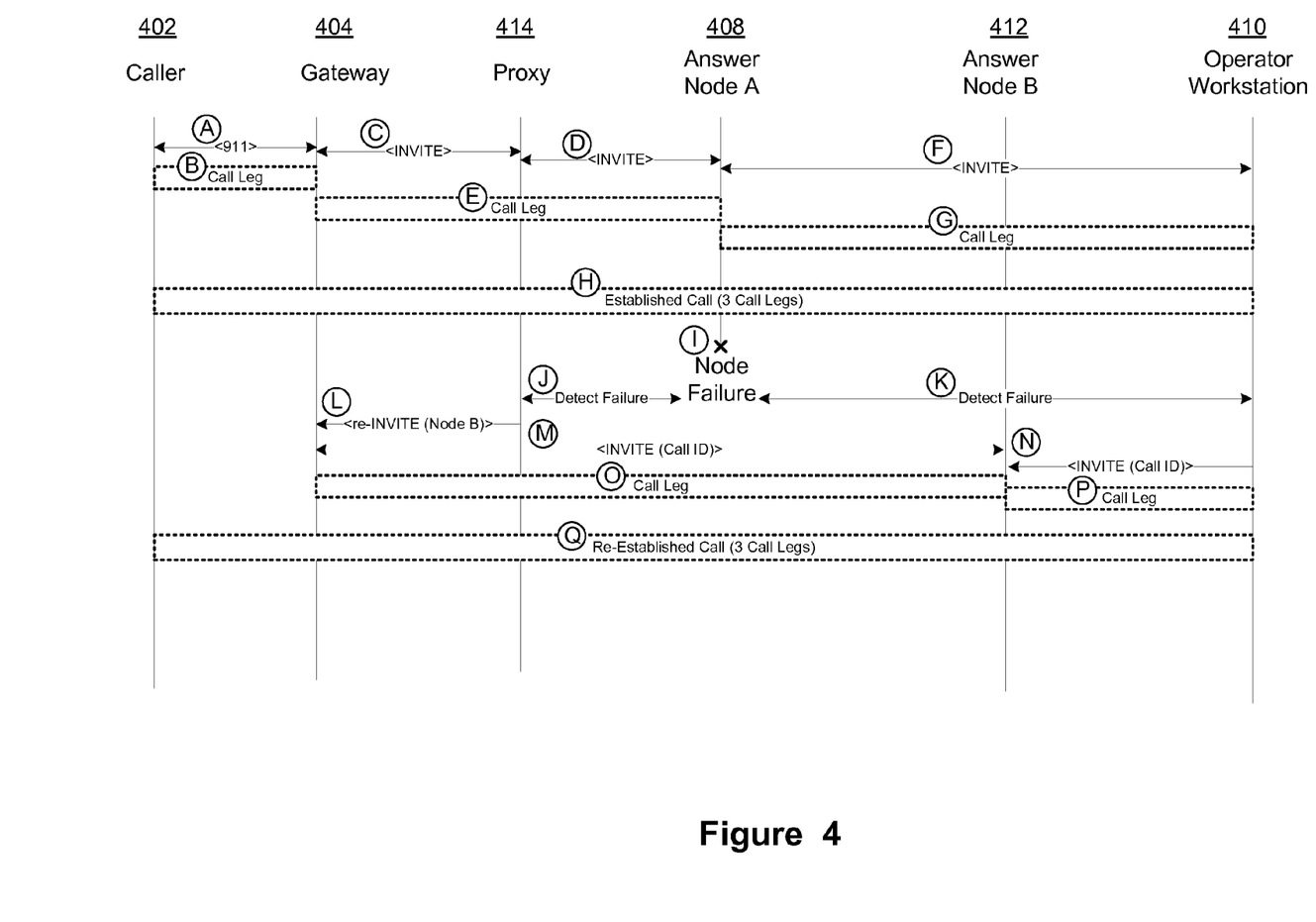
FIG. 4 depicts a process flow for re-establishing emergency calls.

FIG. 4 depicts a process flow for establishing and re-establishing emergency calls. As depicted in FIG. 4, a caller 402 attempts to establish an emergency call to a public safety answering point, for example by dialing a common emergency number such as 9-1-1 (A). The emergency call request is received at the emergency gateway 404, which establishes a call leg (B) with the caller 402. The emergency gateway 404 attempts to establish the second leg of the emergency call and sends a SIP INVITE (C) to the proxy 414. The proxy 414 receives the INVITE and forwards it (D) to the appropriate call answer node A 408. The proxy 414 may re-write information in the INVITE, for example by adjusting one or more parameters in the header of the INVITE message. The call answer node A 408 establishes a call leg (E) directly with the emergency gateway 404. The call answer node A 408 determines an operator that can take the call and forwards the INVITE (F) to the operator's workstation 410. A call leg is established between the call answer node A 408 and the operator 410 (G). The individual call legs established at (B), (E) and (G) are bridged in order to establish call (H). The call legs (E) and (G) established through the answer node A 408 may be associated with unique identifying information that is available at both the proxy 414 and the operator workstation 410. The unique identifying information may be for example a random number generated at the proxy and transmitted to the operator in the call establishment procedure. Other types of unique identifying information are possible, such as a combination of IP addresses used as part of the call establishment.

At some point during the established call (H), the answer node A fails (I). The failure may be the result of various events, including software failures, hardware failures or other failures such as loss of power. Regardless of the reason for the failure, it results in the disconnection of the caller 402 and the operator 410, since the failed call answer node 408 can no longer bridge the two call legs (E) and (G). The proxy detects the failure of the node (J). Similarly the operator detects the failure of the node (K). The detection may be achieved by a heart beat signal that is returned by the call answer node when it is operating. When no return signal is received, it is considered an indication that the call answer node has failed. Once the proxy detects the failure, it attempts to re-establish a call between the caller and the operator who originally took the call. For each call established through the proxy, the proxy sends an indication to the emergency gateway that it should attempt to re-establish the call with the backup call answer node B 412. The indication sent from the proxy 414 to the emergency gateway 404 may be in the form of an INVITE message or a REFER message. The message includes information that the emergency gateway 404 can utilize to identify the first call leg established to the caller 402, as well as information for identifying the previously established call legs on the call answer node 408 that can be used to re-establish the call on the backup call answer node B 412.

The proxy may send a re-INVITE message (L) to the emergency gateway 404 indicating that a call should be re-established at call answer node B 412. The re-INVITE message includes call identifying information that can be used by the gateway to identify the first call leg established with the caller 402. The re-INVITE message (L) includes information that can be used to identify the previously established call legs, which is sent in an INVITE message (M) sent to the backup call answer node B 412. The INVITE (M) is received at the call answer node B 412, which determines that the INVITE message is for re-establishing a previously established call, for example by the presence of the call identifying information. The call answer node 412 receives the INVITE and checks a re-establishment queue for other received INVITE messages that include matching call identifying information. If no INVITE having matching identifying information is found, the INVITE is placed into the re-establishment queue. If the INVITE message has not been matched in a set period of time, for example 5 seconds, the INVITE message may be processed in the normal manner.

After the operator 410 detects (K) the failure of the call answer node A 408, it sends an INVITE message to the backup call answer node 412 that includes the same call identifying information sent by the proxy. The call answer node B 412 receives the INVITE message, and again checks the re-establishment queue for INVITE messages having matching call identifying information. When a match is found, call legs are established between the call answer node B 412 and the emergency gateway 404 (O) as well as between the call answer node B 412 and the operator 410 (P). Once the call legs (O) and (P) the individual call legs (O), (P) and (A) are bridged to re-establish the original call between the caller 402 and the operator 410.

Figure 5:
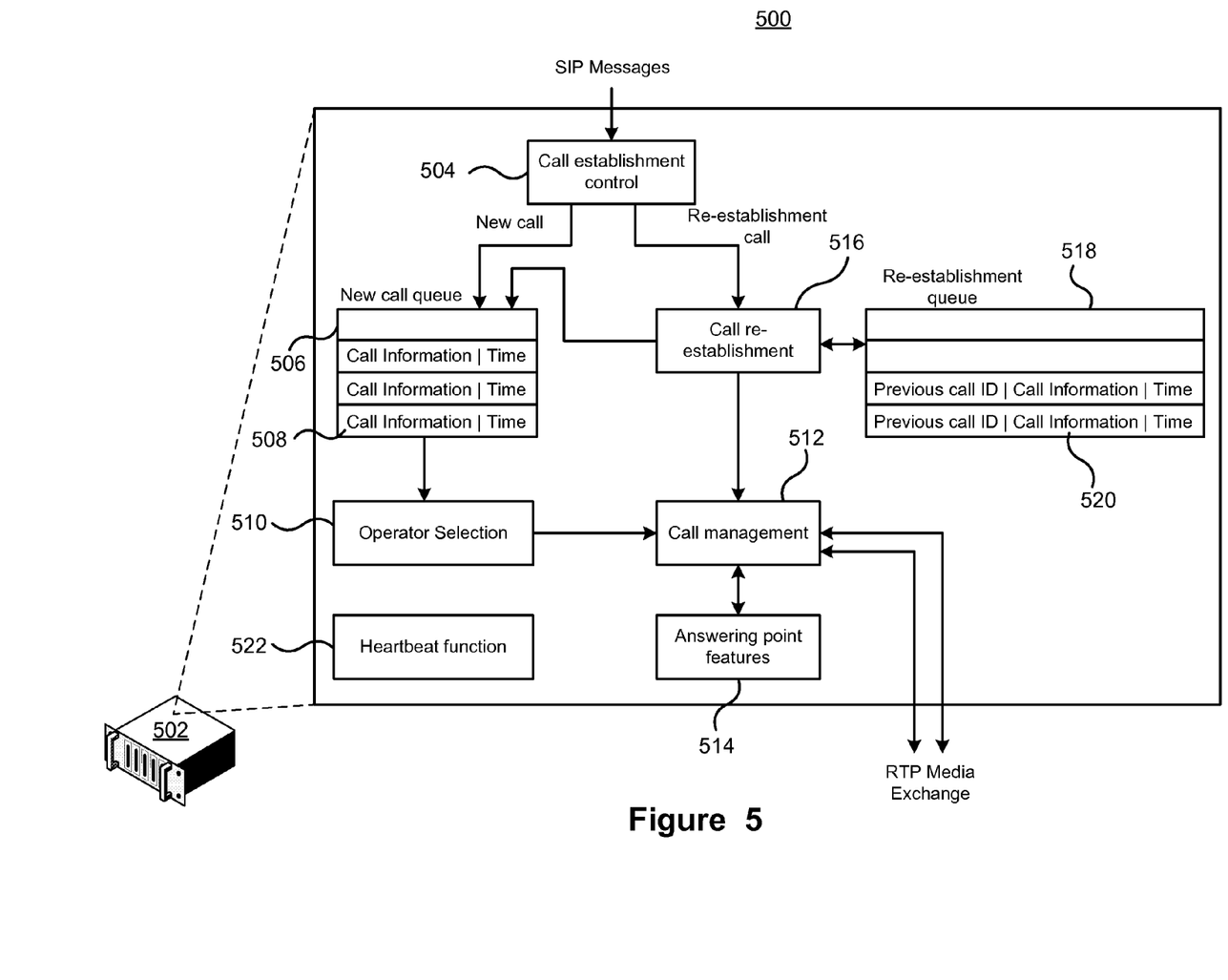
FIG. 5 depicts components of a call answer node capable of re-establishing emergency calls.

FIG. 5 depicts components of call answer node capable of re-establishing emergency calls. The call answer node 500 may be implemented by one or more physical servers 502. Each server comprises a processing unit for executing instructions and a memory unit for storing the instructions. The call answer node 500 comprises call establishment control functionality 504 that receives requests for establishing calls, such as INVITE messages, and processes them. The call establishment control may process the calls to identify new calls, which are provided to a new call queue 506. The new call queue 506 stores INVITEs 508 that have been received. Each INVITE may include an associated time stamp associated with when the INVITE was received as well call information useful for establishing the call. Call INVITEs may be processed in order to determine an operator workstation that can take the call. The operator selection may be performed by operator selection functionality 508 that maintains information on the location of operator workstations as well as which workstations are currently handling an emergency call, or those capable of handling an emergency call. Once an operator is selected the call may be established through call management functionality 510. The call management functionality 510 may bridge one or more media streams together in order to connect different call legs. The call management functionality may use RTP media streaming, or other appropriate protocols for transmitting media, such as audio and/or video. The call management functionality 510 may interact with answering point features functionality 512 such as call recording.

In addition to establishing new calls, the call answer node 500 may further include call re-establishment functionality 514. When the call establishment control functionality 504 receives a call request that is for re-establishing a call, it is passed to call re-establishment functionality 514, which checks the re-establishment queue 516 for previously received call requests that have matching call identifying information. If message is matched, it can be processed by the call management functionality 510, which establishes and bridges call legs, which re-established the call between the caller and the operator. As depicted, in addition to the call information and the time stamp, the request for re-establishing calls 518 includes identifying information that will be sent by both the proxy and the operator workstation and used in matching call requests. If the request for the call re-establishment 518 remains in the re-establishment queue 516 for a period of time greater than a threshold, for example 5 seconds, the call request can be removed from the re-established queue and added to the new call queue and subsequently processed as a new call request.

The call answer node 500 may also comprise heartbeat functionality 520 that may be used in order to detect failure of the call answer node. The heartbeat functionality may periodically send out signals to other components, such as the proxy and operator workstations. When a failure occurs, the signals will no longer be sent and as such, will provide an indication that the call answer node has failed. Accordingly, the proxy or operator workstation may detect the failure after a threshold period of time has passed without receiving the heartbeat signal.

Although described above as heartbeat functionality 520, additional or alternative functionality may be used to detect failure of the call answer node. For example, a real-time transport protocol (RTP) stream between the call answer node and an operator workstation may be monitored. If there is no information sent from the call answer node to an operator workstation in an RTP stream for a given threshold period of time, the call answer node may be assumed to have failed. The threshold period of time may vary, for example from 10 seconds to a minute. The shorter the threshold period of time is, the quicker a potential failure may be detected. However, if the threshold period of time is too short, network delays may be incorrectly determined as a failure.

As described above, the call re-establishment functionality 514 checks each received call request to determine if a match exists in the recovery queue. However, if the emergency gateway and the operator workstations are configured to detect the failures at different time thresholds, then it is possible to search the re-establishment queue only for the requests from whichever of the proxy or the operator workstations is configured to detect the failure the slowest, since the request from the other of the proxy or the operator workstations will already have been received and added to the queue. For example, the proxy may be configured to detect the failure after not receiving a heartbeat signal for 5 seconds, while the operator workstations may detect the failure after 10 seconds. Accordingly, when the call answer node receives re-establishment requests are received from the proxy the requests can be added to the re-establishment queue. When a request is received from the operator workstations, the matching request from the proxy will already be in the re-establishment queue.

Figure 6:
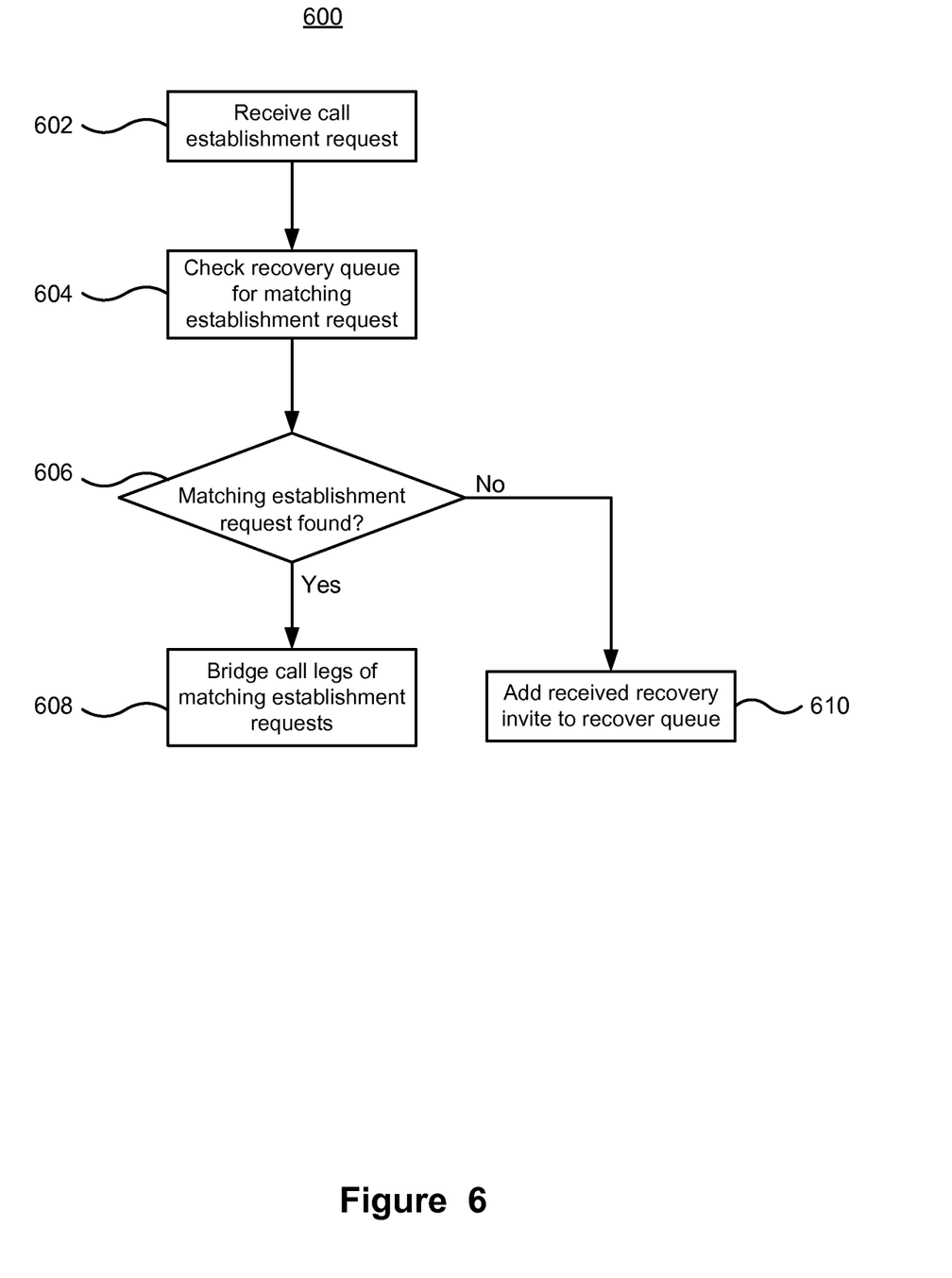
FIG. 6 depicts a method of re-establishing an emergency call.

FIG. 6 depicts a method of re-establishing an emergency call. The method 600 may be implemented by the call answer node. The method receives a call re-establishment request (602). The re-establishment request may be received from either the proxy or an operator's workstation. The re-establishment requests may include call information for setting up the call, as well as call identification information of the previously established call. Once a request is received, the re-establishment queue is checked (604) for re-establishment requests that have call identification information matching the received call identification information of the received request. The check of the re-establishment request determines if a request having matching call identifying information has been found (606). If a matching request is found (Yes at 606), the call legs are established to the emergency gateway and the call operator workstation and the call legs bridged (608) to re-establish the previous call between the caller and the operator. If a matching request is not found (No at 606) the received call request can be added to the re-establishment queue (610).

Figure 7:
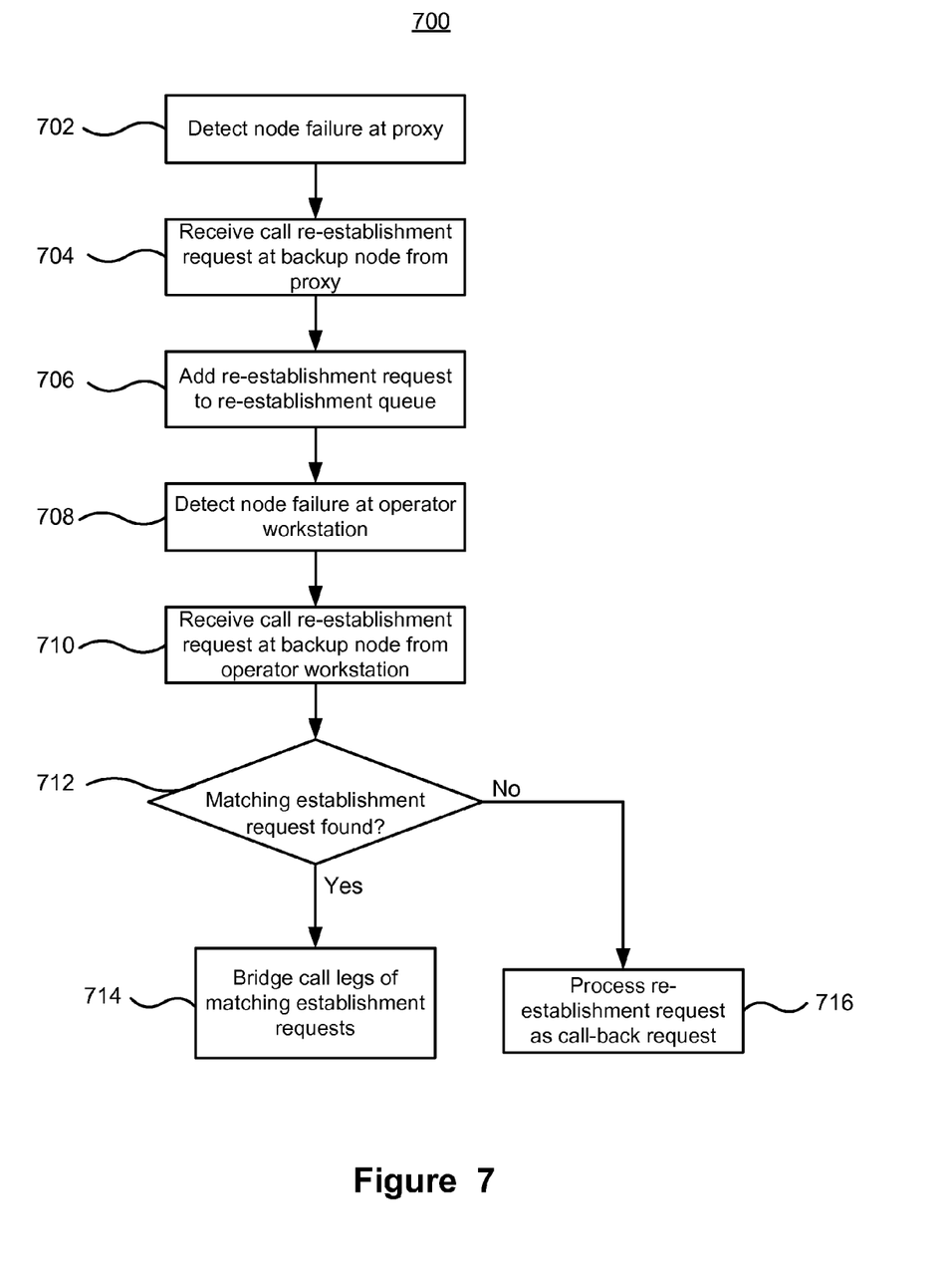
FIG. 7 depicts a further method of re-establishing an emergency call.

FIG. 7 depicts a further method of re-establishing an emergency call. The method 700 is similar to that of FIG. 6. However, the method of 700 only checks the re-establishment queue for call requests from the operator workstations. As such, the operator workstation must send the re-establishment request after the proxy sent the re-establishment request. The proxy detects the failure of the node after not receiving a heartbeat signal for a first period of time such as 5 seconds while the operator workstation detects the failure of the node after not receiving a heartbeat signal after a second period of time that is larger than the first period of time, for example 10 seconds, so that the request from the operator workstation is received after the request from the proxy has been received.

The method 700 detects a node failure at the proxy (702). Upon detecting the failure of the call answer node, the proxy sends a call re-establishment request, which is received at a backup call answer node (704). When the re-establishment request is received from the proxy it is added to the re-establishment queue (706). After the proxy detects the failure, the operator workstation detects the failure of the node (708) and sends a re-establishment request to the backup node from the operator workstation (710). The backup node receives the request from the operator and checks information identifying the previously established call the call request is associated with to determine if a call request in the re-establishment queue has matching identifying information. If a matching re-establishment request is found (Yes at 712), the call legs are established and bridged to re-establish the emergency call between the caller and the operator. If a request having matching call identifying information is not found (No at 712), the re-establishment request from the operator workstation is processed as a call-back (714).

Although the description discloses example methods, systems and apparatus including, among other components, software executed on hardware, it should be noted that such methods and apparatus are merely illustrative and should not be considered as limiting. For example, it is contemplated that these hardware and software components could be embodied exclusively in hardware, exclusively in software, exclusively in firmware, or in any combination of hardware, software, and/or firmware. Further, although certain components or apparatuses are depicted as a single physical component, it is contemplated that they could be implemented as multiple separate components. Further still, it is contemplated that the functionality of multiple separate components described herein could be provided in a single component. Accordingly, while the following describes example systems, methods and apparatus, persons having ordinary skill in the art will readily appreciate that the examples provided are not the only way to implement such systems, methods and apparatus.

What is claimed is:

1. A method of re-establishing a call received at a public safety answering point comprising:
   receiving an emergency call establishment request at a Session Initiation Protocol (SIP) proxy, the call originating from caller device;
   directing, from the SIP proxy, establishment of a call leg for the emergency call between a first emergency call answer node and an emergency call operator workstation;
   directing, from the SIP proxy, establishment of a call leg for the emergency call between the first emergency call answer node and an emergency call gateway;
   detecting at the SIP proxy a failure of the first emergency call answer node during the emergency call from the caller device wherein detecting the failure of the first emergency call answer node at the SIP proxy comprises:
      using a heartbeat signal between the first emergency call answer node and the SIP proxy; and
      monitoring a real-time transport protocol (RTP) stream between the first call answer node and the operator workstation;
   causing, with the SIP proxy, transmittal of one of the call establishment request or the previously received call establishment request to a second emergency call answer node;
   receiving the SIP call establishment request at the second emergency call answer node, the call establishment request having an indication of a previously established emergency call to re-establish;
   searching at the second emergency call answer node a call recovery queue at the second emergency call answer node for a previously received call establishment request having a matching indication for the previously established emergency call to re-establish; and
   bridging at the second emergency call answer node a call leg for the received call establishment request and a call leg for the previously received call establishment request having the matching indication for the previously established emergency call to re-establish when a match is found.

2. The method of claim 1, wherein the call establishment request having the indication of the previously established emergency call to re-establish comprises an INVITE or REFER message including an indication that the message is associated with the previously established emergency call, the INVITE or REFER message comprising at least one characteristic for identifying the previously established emergency call.

3. The method of claim 1, wherein the received call establishment request is received from either an emergency call gateway or an emergency call operator workstation and the previously received call establishment request is received from the other of the emergency call gateway and the emergency call operator workstation.

4. The method of claim 1, wherein causing transmittal of one of the call establishment request or the previously received call establishment request comprises sending an INVITE or REFER message including an indication of the emergency call answer node to the emergency call gateway.

5. The method of claim 1, further comprising:
   detecting at the emergency call operator workstation the failure of the initial emergency call answer node; and
   transmitting the other one of the call establishment request or the previously received call establishment request.

6. The method of claim 5, wherein detecting the failure of the initial emergency call answer node at the operator workstation comprises:
   using a heartbeat signal between the initial emergency call answer node and the operator workstation; or
   monitoring a real-time transport protocol (RTP) stream between the initial call answer node and the operator workstation.

7. The method of claim 1, further comprising placing the received call establishment request in the call recovery queue when a match is not found.

8. The method of claim 7, further comprising moving an old call establishment request from the call recovery queue to a normal emergency call queue if the old call establishment request has been in the call recovery queue for at least a threshold period time and no match has been found.

9. An apparatus for re-establishing a call received at a public safety answering point comprising:
   a processor unit for executing instructions; and
   a memory for storing instructions, which when executed by the processor unit configure the apparatus to:
      receive a Session Initiation Protocol (SIP) call establishment request having an indication of a previously established emergency call to re-establish;
      search a call recovery queue for a previously received call establishment request having a matching indication for the previously established emergency call to re-establish; and
   where:
      a call leg is bridged for the received call establishment request and a call leg for the previously received call establishment request having the matching indication for the previously established emergency call to re-establish when a match is found; and the received call establishment request is placed in the call recovery queue when a match is not found and moving an old call establishment request from the call recovery queue to a normal emergency call queue if the old call establishment request has been in the call recovery queue for at least a threshold period time.

10. The apparatus of claim 9, wherein the call establishment request having the indication of the previously established emergency call to re-establish comprises an INVITE or REFER message including an indication that the message is associated with the previously established emergency call, the INVITE or REFER message comprising at least one characteristic for identifying the previously established emergency call.

11. The apparatus of claim 9, wherein the received call establishment request is received from either an emergency call gateway or an emergency call operator workstation and the previously received call establishment request is received from the other of the emergency call gateway and the emergency call operator workstation.

12. A system for re-establishing a call received at a public safety answering point comprising:
  a Session Initiation Protocol (SIP) proxy node comprising:
    a processor unit for executing instructions; and
    a memory for storing instructions, which when executed by the processor unit configure the SIP proxy node to:
      receive an emergency call establishment request;
      direct establishment of a call leg for the emergency call between an initial emergency call answer node and an emergency call operator workstation;
      direct establishment of a call leg for the emergency call between the initial emergency call answer node and an emergency call gateway;
      detect a failure of the initial emergency call answer node by using a heartbeat signal between the initial emergency call answer node and the SIP proxy; or
      monitoring a real-time transport protocol (RTP) stream between the initial call answer node and the operator workstation; and
      cause, with the SIP proxy, transmittal of one of the SIP call establishment request or the previously received call establishment request to a second emergency call answer node to re-establish a call leg;
  the second emergency call answer node comprising:
    a processor unit for executing instructions; and
    a memory for storing instructions, which when executed by the processor unit configure the apparatus to:
      receive the SIP call establishment request having an indication of the previously established emergency call to re-establish;
      search a call recovery queue for a previously received call establishment request having a matching indication for the previously established emergency call to re-establish; and
      bridge a call leg for the received call establishment request and the call leg for the previously received call establishment request having the matching indication for the previously established emergency call to re-establish when a match is found.

13. The system of claim 12, wherein causing transmittal of one of the call establishment request or the previously received call establishment request comprises sending an INVITE or REFER message including an indication of the emergency call answer node to the emergency call gateway.

14. The system of claim 12, further comprising:
  an emergency call operator workstation comprising:
    a processor unit for executing instructions; and
    a memory for storing instructions, which when executed by the processor unit configure the emergency call operator workstation node to:
  detect the failure of the initial emergency call answer node; and
  transmit the other one of the call establishment request or the previously received call establishment request.

15. The system of claim 14, wherein detecting the failure of the initial emergency call answer node at the operator workstation comprises:
  using a heartbeat signal between the initial emergency call answer node and the operator workstation; or
  monitoring a real-time transport protocol (RTP) stream between the initial call answer node and the operator workstation.

* * * * *